(12) United States Patent
Stamires et al.

(10) Patent No.: US 6,589,902 B1
(45) Date of Patent: Jul. 8, 2003

(54) ATTRITION RESISTANT, SHAPED, CRYSTALLINE ANIONIC CLAY-CONTAINING BODIES

(75) Inventors: Dennis Stamires, Newport Beach, CA (US); Paul O'Connor, Hoevelaken (NL)

(73) Assignee: Akzo Nobel N.V. (NL)

( * ) Notice: Subject to any disclaimer, the term of this patent is extended or adjusted under 35 U.S.C. 154(b) by 100 days.

(21) Appl. No.: 09/636,695

(22) Filed: Aug. 11, 2000

Related U.S. Application Data

(63) Continuation-in-part of application No. 09/372,299, filed on Aug. 11, 1999, now abandoned.

(51) Int. Cl.$^7$ .............................. B01J 21/10; B01J 21/16
(52) U.S. Cl. ........................ 502/80; 423/625; 423/635; 423/636
(58) Field of Search ............................ 502/80; 423/624, 423/625, 635, 636

(56) References Cited

U.S. PATENT DOCUMENTS

| | | | |
|---|---|---|---|
| 4,656,156 A | * 4/1987 | Misra | 502/414 |
| 4,774,212 A | 9/1988 | Drezdon | 502/62 |
| 4,946,581 A | 8/1990 | Van Broekhoven | 208/120 |
| 5,153,156 A | * 10/1992 | Schutz et al. | 502/63 |
| 6,028,023 A | * 2/2000 | Vierheilig | 502/80 |
| 6,171,991 B1 | * 1/2001 | Stamires et al. | 501/108 |

FOREIGN PATENT DOCUMENTS

| | | | |
|---|---|---|---|
| EP | 0 278 535 | 8/1988 | C10G/11/04 |
| WO | WO 99/20389 | 4/1999 | B01J/21/16 |

* cited by examiner

*Primary Examiner*—Tom Dunn
*Assistant Examiner*—Christina Ildebrando
(74) *Attorney, Agent, or Firm*—Louis A. Morris

(57) ABSTRACT

The present invention is directed to a process for the preparation of crystalline anionic clay-containing bodies from sources comprising an aluminum source and a magnesium source comprising the steps of:
  a) preparing a precursor mixture,
  b) shaping the precursor mixture to obtain shaped-bodies,
  c) optionally thermally treating the shaped bodies, and
  d) aging to obtain crystalline anionic clay-containing bodies.

The quintessence of the present invention is that the bodies are shaped prior to the forming of the crystalline anionic clay in said bodies. This results in very attrition resistant bodies, without the need to add a binder material.

20 Claims, 2 Drawing Sheets

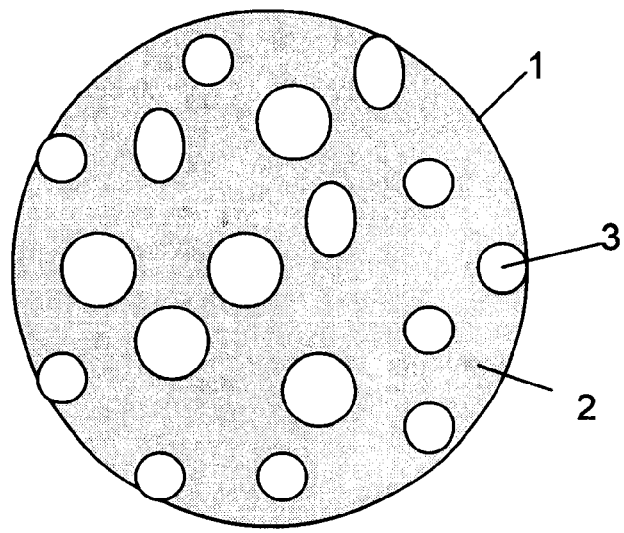
Figure 1. Shaped body according to the invention
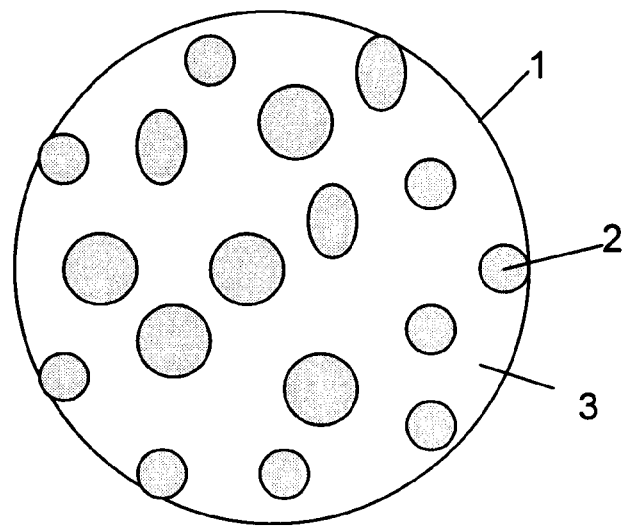
Figure 2. Shaped body according to the prior art

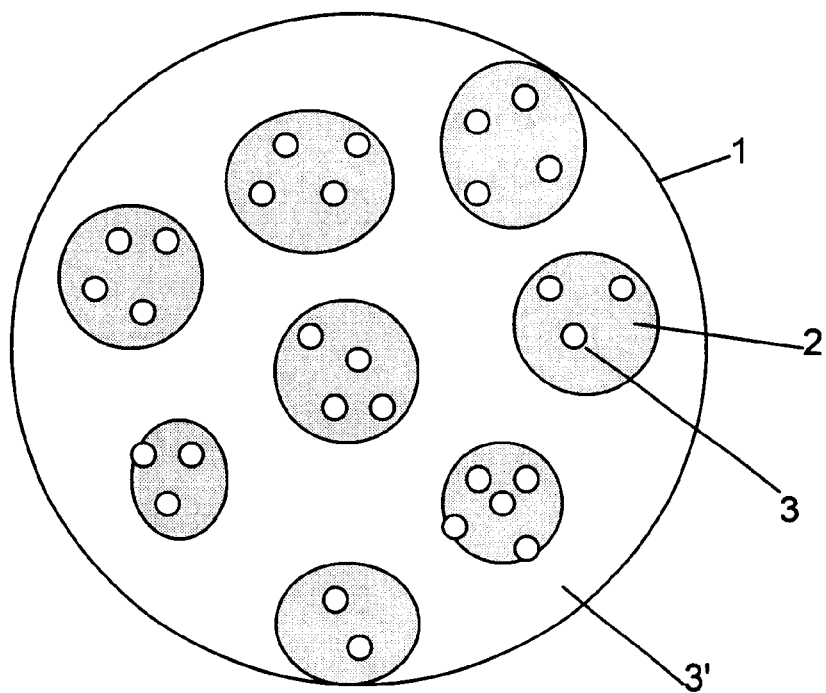
Figure 3. Composite particle comprising shaped bodies according to the invention

ATTRITION RESISTANT, SHAPED, CRYSTALLINE ANIONIC CLAY-CONTAINING BODIES

CROSS REFERENCE TO RELATED APPLICATIONS

This application is a continuation-in-part of U.S. application Ser. No. 09/372,299, filed Aug. 11, 1999 now abandoned.

BACKGROUND OF THE INVENTION

1. Filed of the invention

The present invention pertains to shaped crystalline anionic clay-containing bodies and a process for the preparation thereof.

2. Description of the Prior Art

Examples of crystalline anionic clays include hydrotalcite, meixnerite, sjögrenite, pyroaurite, stichtite, reevesite, eardleyite, manassite, and barbertonite. Crystalline anionic clays have several applications in the catalyst field and as absorbents. For most commercial applications crystalline anionic clays are formed into shaped bodies such as spheres. In all applications where shaped bodies are exposed to severe processing conditions and environments, such as oil refinery applications, separations, purifications, and absorption processes, it is of paramount importance that the integrity of the crystalline anionic clay-containing shaped bodies is kept intact and attrition is prevented.

In the prior art, crystalline anionic clays are usually incorporated into binder or matrix material in order to obtain attrition resistant shaped bodies. Commonly used binder or matrix material is alumina prepared from alumina precursors such as aluminum chlorohydrol, soluble aluminum salts, and acid dispersed pseudoboehmite; silica such as silica sols, silicates, silica-alumina cogels, and combinations thereof. Thus in EP-0 278 535 FCC additive or catalyst particles are described which are prepared by embedding hydrotalcite and optionally zeolite in a silica, silica-alumina or alumina matrix. To this end, hydrotalcite is slurried in a matrix precursor dispersion or solution and spray-dried.

However, when crystalline anionic clay is embedded in a matrix, the amount of active crystalline anionic clay ending up in the resulting shaped bodies is relatively small. There are applications in which for performance reasons it is desired that the shaped bodies consist or mostly consist of active crystalline anionic clay. Also, by the incorporation of crystalline anionic clay into matrix material, physical properties of the crystalline anionic clay such as specific surface area, pore size distribution; etcetera may be detrimentally affected. Further, the distribution of the crystalline anionic clay within the matrix is difficult to control. Another disadvantage of having to use a matrix to obtain attrition resistant bodies is the fact that most commonly used matrix/binder materials have some chemical activity, which in certain applications can cause undesirable side reactions. For instance, one of the most commonly used binder materials in FCC catalysts and additives is silica or silica based material. These types of binders are not suitable for use in sulfur oxides removal additives, because they detrimentally affect the sulfur removal.

In one embodiment, the present invention is directed to a process for the preparation of crystalline anionic clay-containing bodies from sources comprising an aluminum source and a magnesium source, comprising the steps of:

a) preparing a precursor mixture, b) shaping the precursor mixture to obtain shaped bodies, c) optionally thermally treating the shaped bodies, and d) aging to obtain crystalline anionic clay-containing bodies.

In a second embodiment, the present invention comprises a crystalline anionic-clay-containing body wherein any binding material present in the body is present in a discontinuous phase.

Other embodiments of our invention encompass details about compositions, manufacturing steps, etc. all of which are hereinafter disclosed in the following discussion of each facets of the present invention.

BRIEF DESCRIPTION OF THE DRAWINGS

FIG. 1: Schematic view of a shaped body according to the invention

FIG. 2: Schematic view of a shaped body according to the prior art

FIG. 3: Schematic view of a composite particle comprising shaped bodies according to the invention The present invention provides crystalline anionic clay-containing bodies which are attrition resistant without high amounts of binder having to be present. In fact, crystalline anionic clay-containing bodies are provided which can be binder-free. The crystalline anionic clay distribution within the crystalline anionic clay-containing bodies of the invention can easily be controlled as will be explained further in the description. Within the context of the present specification, the term "crystalline anionic clay" means a clay which has an X-ray diffraction pattern containing the specific X-ray diffraction pattern which characterizes the specific type of anionic clay.

The essence of the present invention is that crystalline anionic clay is formed after shaping. This results in very attrition resistant bodies, without the need to add a binder material.

The shaped bodies can be prepared in various ways. In a preferred embodiment of the invention, an aluminum source and a magnesium source are combined in a slurry to form a precursor mixture. Subsequently, said precursor mixture is shaped. The resulting shaped bodies are aged, optionally after thermal treatment, in a liquid to obtain crystalline anionic clay-containing bodies.

It is also possible to prepare a precursor mixture from only one source such as an aluminum source or a magnesium source, shape it, and then add one or more additional other sources to the shaped bodies in any of the subsequent process steps. During the aging step, the various sources react to give the crystalline anionic clay-containing bodies. Of course, it is also possible to use combinations of the two preparation routes described above, for instance: add; the aluminum source and the magnesium source to form the precursor mixture, shape to form bodies, and then age the shaped bodies in a liquid containing additional magnesium source to form anionic clay-containing bodies with a higher magnesium content on the outside of the shaped body.

Suitable alumina sources include aluminum oxides and hydroxides such as transition alumina, aluminum trihydrate (gibbsite, bayerite) and its thermally treated forms (including flash calcined alumina), sols, amorphous alumina, (pseudo)boehmite, aluminum-containing clays such as kaolin, sepiolite, hydrotalcite, and bentonite, modified clays such as metakaolin, alumina salts such as aluminum nitrate, aluminum chloride, aluminum chlorohydrate, sodium aluminate. With the preparation method according to the invention it is also possible to use cruder grades of aluminum trihydrate such as BOC (Bauxite Ore Concentrate) or bauxite. When clays are used as an Al-source, it may be necessary to activate the alumina in the clay by acid or base treatment, for instance acid-treated bentonite, (hydro)thermal treatment, or combinations thereof, etcetera. Acid treatment comprises treatment with nitric acid, acetic acid, phosphoric acid, sulfuric acid, hydrochloric acid, etcetera. Thermal treatment is usually performed at temperatures ranging from 30–1000° C., preferably 200–800° C., for a time ranging from several minutes to 24 hours, preferably 1–10 hours. Also mixtures of the above-mentioned aluminum sources can be used, and said different aluminum sources can be combined in the precursor mixture in any sequence. It is also possible to add an aluminum source after the shaping step. In that case, the precursor mixture may or may not already contain an aluminum source. If an aluminum source is added after the shaping step, it preferably is in liquid when contacted with the shaped bodies. This can be done by dispersing or dissolving the aluminum source and adding it to the shaped bodies. Alternatively, the aluminum source can be added to the liquid in which the shaped bodies are aged.

Also, other aluminum sources than clay, such as aluminum trihydrate, may be pre-treated prior to the addition to the precursor mixture or prior to contacting it with the shaped bodies. Said pre-treatment may involve treatment with acid, base treatment, thermal and/or hydrothermal treatment, all optionally in the presence of seeds or combinations thereof. It is not necessary to convert all of the aluminum source into crystalline anionic clay. Any excess aluminum will be converted into silica-alumina, alumina (usually in the form of γ-alumina or (crystalline) boehmite) and/or aluminia-magnesia during the aging step. These compounds improve the binding properties of the shaped bodies and may also provide different types of desirable functionalities for the bodies. For instance, silica-alumina and alumina provide acid sites for catalytic cracking and alumina (crystalline) boehmite also improves the nickel encapsulation capacity of the shaped bodies. The formation of, for example, (crystalline) boehmite may be promoted by adding seeds, either in the precursor mixture, in the aluminum source or during aging.

Suitable magnesium sources include magnesium oxides or hydroxides such as MgO, $Mg(OH)_2$, hydromagnesite, magnesium salts such as magnesium acetate, magnesium formate, magnesium hydroxy acetate, magnesium carbonate, magnesium hydroxy carbonate, magnesium bicarbonate, magnesium nitrate, magnesium chloride, magnesium-containing clays such as dolomite, saponite, sepiolite. Also mixtures-of the above-mentioned magnesium sources can be used, and said different magnesium sources can be combined in the precursor mixture in any sequence and/or in any process step after the shaping step. If a magnesium source is added after the shaping step, it is preferably in liquid when contacted with the shaped bodies. This can be done by dispersing or dissolving the magnesium source and adding it to the shaped bodies. Alternatively, the magnesium source can be added to the liquid in which the shaped bodies are aged.

The magnesium source may be pre-treated prior to the addition to the precursor mixture and/or prior to the addition to the shaped bodies. Said pretreatment may comprise a thermal and/or a hydrothermal treatment, an acid treatment, a base treatment, all optionally in the presence of a seed, and/or combinations thereof.

It is not necessary to convert all of the magnesium source into crystalline anionic clay. Any excess magnesium will usually be converted into brucite, magnesia or alumina-magnesia. For the sake of clarity, this excess of magnesium compounds in the shaped particle will be referred to in the description as magnesia. The presence of magnesia or alumina-magnesia in the shaped body may provide desirable functionalities to the shaped bodies. The presence of magnesia provides basic sites which render the shaped body suitable fore removing or neutralizing strong acid streams of gases or liquids.

Shaped bodies containing anionic clay, anionic clay and magnesia or anionic clay and alumina, or even anionic clay, alumina and magnesia may be used in processes involving purification and/or separation or organic compounds in hydrocarbon streams, e.g. the removal of S-compounds and/or N-compounds in the gasoline and diesel fraction in FCC. Further, said shaped bodies may be used in water treatment for removing organic and inorganic compounds for the purpose of purifying, clarifying, and separating undesirable compounds from said water streams, including ion exchange processes. Also, said shaped bodies may be used in the treatment of gaseous streams in industrial processes to remove and separate gaseous compounds such as process gaseous streams containing chlorine, hydrochloric acid, ammonia, sulfur compounds, and phosphorous compounds.

The various process steps will be described in more detail below.

Preparation of the Precursor Mixture

In this step a precursor mixture is prepared from an aluminum source and/or a magnesium source in a liquid. In fact, all liquids are suitable, as long as they do not detrimentally interfere with the various sources. Suitable liquids are water, ethanol, propanol, etcetera. The amount of liquid can be chosen such that a mixture with a milky substance is obtained, but also mixtures with a; higher viscosity, for instance doughs, are suitable. If more than one source is used for the precursor mixture, the sources can be added as solids, but they can also be added in liquid. The various sources can be added in any sequence. The preparation of the precursor mixture can be carried out with or without stirring, at room temperature or elevated temperature. Optionally, the precursor mixture and/or the separate sources are homogenized by, for instance, milling. Some conversion to crystalline anionic clay may already take place upon combining the various sources, in fact, it is preferred that at least 5 wt % of the final total amount of anionic clay is already formed, but for the present invention it is essential that conversion also takes place after the shaping step. Usually more than 25 wt %, preferably more than 50 wt %, more preferably more than 75 wt % and most preferably between 80–95 wt % of the final amount of anionic clay in the shaped body is formed after the shaping step, because then shaped bodies with the highest physical strength are obtained. The Mg:Al ratio may vary from 1:10, preferably 1 to 6, most preferably 2 to 4.

If desired, organic or inorganic acids and bases, for example for control of the pH, may be added to the precursor mixture or added to any one of the aluminum source and/or magnesium source before these are added to the precursor mixture. An example of a preferred modifier is an ammonium base, because upon drying no deleterious cations remain in the anionic clay. The precursor mixture may be preaged prior to the shaping step. Said pre-aging temperature may range from 30 to 500° C. and may be conducted under atmospheric or increased pressure such as autogeneous pressure at temperatures above 100° C. The aging time can vary from 1 minute to several days, for instance 7 days. By adding specific anions to the precursor mixture and/or any of the aluminum and or magnesium source the interlayer-charge balancing anions present may be controlled. Examples of suitable anions are carbonates, bicarbonates, nitrates, chlorides, sulfates, bisulfate's, vanadates, tungstates, borates, phosphates, pillaring anions such as $V_{10}O_{28}^{-6}$, $Mo_7O_{24}^{6-}$, $PW_{12}O_{40}^{3-}$, $B(OH)_4^-$, $B_4O_5(OH)_4^{2-}$, $HBO_4^{2-}$, $HGaO_3^{2-}$, $CrO_4^{2-}$ formates, acetate, and mixtures thereof. It is also believed that the presence of some of these anions such as carbonate, bicarbonate, sulfate and or nitrate influences the forming of side products such as brucite. For instance, the addition of ammonium hydroxide promotes meixnerite formation, whereas the addition of ammonium carbonate promotes hydrotalcite formation.

Shaping

Suitable shaping methods include spray-drying, pelletising, extrusion (optionally combined with kneading), beading, or any other conventional shaping method used in the catalyst and absorbent fields or combinations thereof. The amount of liquid present in the precursor mixture used-for shaping should be adapted to the specific shaping step to be conducted. It might be advisable to (partially) remove the liquid used in the precursor mixture and/or add additional or other liquid, and/or change the pH of the precursor mixture to make the precursor mixture gellable and thus suitable for shaping. Various additives commonly used in the various shaping methods such as extrusion additives may be added to the precursor mixture used for shaping.

Thermal Treatment

After shaping the shaped bodies may optionally be submitted to a thermal treatment. Such a treatment increases the physical strength of the particles. The thermal treatment can be conducted in an oxygen-containing atmosphere, in an inert atmosphere or in steam at temperatures varying from 30 to 900° C. for a time ranging from a few minutes to 24 hours. As in, for instance, spray-drying a thermal treatment is inherently involved, a further thermal treatment may not be necessary.

Aging

In this step, the shaped bodies are immersed in a protic liquid or protic gaseous medium. During the aging step crystallization to crystalline anionic clay takes place. Suitable protic aging liquids or gaseous media are those liquids and gaseous media in which the shaped bodies do not dissolve, such as water, ethanol, methanol, propanol, steam, gaseous water, gaseous ethanol, etcetera. Increasing the temperature of the liquid and/or the pressure can reduce the aging time. The aging can also be conducted under autogeneous conditions. The aging temperature may range from 30 to 500° C. The aging time can vary from 1 minute to several days, for instance 7 days. For some purposes it is advantageous to conduct several aging steps, optionally with intermediate drying steps, optionally followed by calcination steps. For instance, an aging step with a temperature below 100° C. may be followed by a hydrothermal aging step at a temperature above 100° C. and autogeneous pressure, or vice versa. As will be described below in further detail, additives can be added before, after or during any aging step. By adding specific anions to the aging medium the interlayer-charge balancing anions present may be controlled. Examples of suitable anions are carbonates, bicarbonates, nitrates, chlorides, sulfates, bisulfates, vanadates, tungstates, borates, phosphates, pillaring anions such as $V_{10}O_{28}^{-6}$, $Mo_7O_{24}^{6-}$, $PW_{12}O_{40}^{3-}$, $B(OH)_4^-$, $B_4O_5(OH)_4^{2-}$, $HBO_4^{2-}$, $HGaO_3^{2-}$, $CrO_4^{2-}$, formates, acetate, and mixtures thereof. It is also believed that the presence of some of these anions such as carbonate, bicarbonate, sulfate, and/or nitrate influence the forming of side products such as brucite. For instance, the addition of ammonium hydroxide promotes meixnerite-like clay formation, whereas the addition of ammonium carbonate promotes hydrotalcite-like clay formation.

For some applications it is desirable to have additives present in and/or on the shaped bodies according to the invention, both metals and non-metals, such as rare earth metals (especially Ce and La), Si, P, B, Group VI metals, Group VII metals, noble metals such as Pt and Pd, alkaline earth metals (for instance Ca and Ba) and/or transition metals (for example Mn, Fe, Ti, V, Zr, Cu, Ni, Zn, Mo, Sn). Said metals and non-metals can be added separately or in mixtures in any of the preparation steps of the invention. For instance, they can easily be deposited on the shaped bodies before, during, or after aging, or else they can be added to the precursor mixture and/or any of the aluminum or magnesium sources. Suitable sources of metals or non-metals are oxides, halides, or any other salt, such as chlorides, nitrates, phosphates, etcetera. As mentioned above, the metals and non-metals may be added in any of the preparation steps. This can be especially advantageous for controlling the distribution of the metals and non-metals in the shaped bodies. It is even possible to calcine the shaped bodies, rehydrate them and add additional additives.

With the help of additives the shaped bodies may be provided with desired functionalities, or the desired functionality may be increased by the addition of additives. The suitability of anionic clay-containing shaped bodies for the removal of SOx and/or NOx compounds in FCC may be improved by the addition of Ce and/or V. The presence of V and Zn improves the suitability for removal of S-compounds in the gasoline and diesel fraction of FCC. As described above, these functionalities may also be built in by using and excess of aluminum source and/or magnesium source. A combination of these measures increases the effect.

The crystalline anionic clay-containing bodies may also be prepared to contain conventional catalyst components such as matrix or filler materials (e.g. clay such as kaolin, titanium oxide, zirconia, alumina, silica, silica-alumina, bentonite etcetera), molecular sieve material (e.g. zeolite Y, ZSM-5 etcetera). Said conventional catalyst components may be added prior to the shaping step. Because the anionic clay is formed in situ, the resulting body will have a homogeneous dispersion of anionic clay and catalyst components. With the method according to the invention, multiple functional bodies can be prepared which can be used as a catalyst or as a catalyst additive.

The process according to the invention may be conducted batch-wise or in a continuous mode, optionally in a continuous multi-step operation. The process may also be conducted partly batch-wise and partly continuous.

If desired, the crystalline anionic clay-containing shaped bodies prepared by the process according to the invention may be subjected to ion exchange, in which the interlayer charge-balancing anions of the clay are replaced with other anions. Said other anions are the ones commonly present in anionic clays and include pillaring anions such as $V_{10}O_{28}^{-6}$, $Mo_7O_{24}^{6-}$, $PW_{12}O_{40}^{3-}$, $B(OH)_4^-$, $B_4O_5(OH)_4^{2-}$, $HBO_4^{2-}$, $HGaO_3^{2-}$, $CrO_4^{2-}$. Examples of suitable pillaring anions are given in U.S. Pat. No. 4,774,212, which is included by reference for this purpose. Said ion exchange can be conducted as soon as the crystalline anionic clay has been formed.

The present invention is further directed to crystalline anionic clay-containing shaped bodies obtainable by the process according to the invention. As mentioned above, the shaped bodies appear to have high mechanical strength and attrition resistance, comparable with that of clay-containing bodies prepared by dispersing clay into a matrix or binder material and then shaping the clay- containing composition, yet without matrix or binder material having to be added to the crystalline anionic clay. This means that with the process according to the invention, crystalline anionic clay-containing shaped bodies can: be prepared containing more than 50 wt %, preferably more than 70 wt %, or even more preferably more than 90 wt % crystalline anionic clay. Although binder material may be present in the shaped crystalline anionic clay containing bodies according to the invention, for instance as a result of an excess aluminum source present in the precursor mixture, any binder that is present in the shaped bodies according to the invention will be present as a discontinuous phase, as is depicted schematically in FIG. 1. This is in contrast to clay-containing bodies prepared in the conventional way, i.e. by embedding clay into a matrix or binder material, where the binder material in the bodies is present in a continuous phase, as is schematically depicted in FIG. 2. It is of course also possible to incorporate the crystalline anionic clay-containing shaped bodies into a matrix. In that case, composite particles are obtained which comprise crystalline anionic clay-containing shaped bodies with, optionally, binder material in a discontinuous phase, embedded in a binder material, as is schematically depicted in FIG. 3.

FIG. 1: Schematic view of a shaped body according to the invention

FIG. 2: Schematic view of a shaped body according to the prior art

FIG. 3: Schematic view of a composite particle comprising shaped bodies according to the invention In FIG. 1 a schematic view is given of a shaped crystalline anionic clay-containing body (1) according to the present invention which comprises crystalline anionic clay (2) and binder material (3) in a discontinuous phase. In FIG. 2 a schematic view is given of a shaped crystalline anionic clay-containing body (1) according to the prior art which comprises crystalline anionic clay (2) and binder material (3) in a continuous phase. In FIG. 3 a schematic view is given of a composite particle comprising crystalline anionic clay-containing shaped bodies (1) which comprise crystalline anionic clay (2) and binder material (3) in a discontinuous phase which are embedded in binder material (3') which is in a continuous phase.

The invention is further illustrated by examples which are not to be considered limitative.

EXAMPLES

Example 1

Catapal® and MgO were mixed in a slurry at room temperature (Mg:Al atomic ratio 1:3) and spray-dried. The resulting particles were calcined at 500° C. for one hour. The calcined particles were re-slurried and aged overnight at 85° C. XRD showed that hydrotalcite was present in the particles. The particles had a good attrition index. The average particle size as measured by laser light scattering was 63 microns, the pore volume ($H_2O$) was 0.35 ml/g, the L.O.I. was 31.5%, the average bulk density 0.688 gbl, the B.E.T. surface area 210 $m^2/g$.

Example 2

Catapal®, peptized with 0.5 wt % of formic acid, and MgO were mixed in a slurry (Mg:Al mole ratio) and spray-dried. The resulting particles were calcined at 500° C. for one hour. The calcined particles were re-slurried and aged overnight at 85° C. XRD showed that hydrotalcite was present in the particles. The particles had a good attrition index. The average particle size as measured with laser light scattering was 67 microns, the L.O.I. was 32.7%, the average bulk density 0.703 g/l, the B.E.T. surface area 217 $m^2/g$.

Example 3

30 g of MgO and 30 g of Gibbsite were mixed in 500 ml water at room temperature. Particles were made by pelletising. The particles were calcined at 500° C. for 18 hours. Subsequently, the calcined particles were suspended in water and aged for 18 hours at 65° C. X-ray diffraction showed that hydrotalcite was present in the resulting particles.

Example 4

300 g of MgO and 300 g of Gibbsite were mixed in 5 l water at room temperature. Particles were made by spray drying. The particles were calcined at 500° C. for 18 hours. Subsequently, the calcined particles were suspended in water and aged for 18 hours at 65° C.

Example 5

3 g of MgO and 3 g of Gibbsite were mixed in 50 ml water and 6 wt % ammonium vanadate and 3 wt % cerium nitrate (calculated on the reactant solids, defined as the oxides) at room temperature. Particles were made by pelletising. The particles were calcined at 500° C. for 18 hours. Subsequently, the calcined particles were suspended in water and aged for 18 hours at 65° C.

Example 6

3 g of MgO and 3 g of Gibbsite were mixed in 50 ml water and 10 wt % copper nitrate (calculated on the reactant solids, defined as the oxide) at room temperature. Particles were made by pelletising. The particles were calcined at 500° C. for 18 hours. Subsequently, the calcined particles were suspended in water and aged for 18 hours at 65° C. X-ray diffraction showed that hydrotalcite was present in the resulting particles.

Example 7

Fine ground gibbsite and magnesium oxide powder were slurried in water in quantities so that in the final mixture the molar ratio of Mg to Al (calculated as the oxides) was close to 2.3. The mixture was homogenized with high shear mixing. The slurry contained about 20 wt % total solids and was pre-aged at ambient temperature overnight. A sample was taken out, filtered washed and dried at 120° C. XRD analysis of this sample indicated that some anionic clay was formed and the rest of the material was unreacted gibbsite, magnesium oxide and brucite. Subsequently the pre-aged material was spray dried. The formed microspheres were calcined at 500° C. for 2 hours and then slurried in water and aged at 65° C. for 8 hours. The product was filtered, washed, dried and subjected to XRD analysis which indicated that the product was anionic clay.

Example 8

Example 7 was repeated except that the starting slurry, was pre-aged at 60° C. overnight. XRD showed that in this stage the material contained anionic clay, unreacted gibbsite, unreacted magnesium oxide, and brucite. The pre-aged material was spray dried and calcined at 500° C. for 2 hours and then slurried in water and aged at ambient temperature for 8 hours. The product was filtered, washed and dried at 120° C. XRD analysis indicated that the product was anionic clay.

Example 9

Example 7 was repeated except that in the slurry before pre-aging and spray drying, 8 wt % of cerium nitrate (calculated on the reactant solids, defined as the oxide) was added. The rest of the processing conditions including calcination and aging was the same. The product was analyzed by XRD which indicated the formation of an anionic clay.

Example 10

Example 7 was repeated except that in the calcined microspheres obtained after spray drying were aged in ammonium vanadate solution containing 4 wt % of the vanadate (calculated on the reactant solids, defined as the oxide) was added. The rest of the processing conditions including calcination and aging was the same. The product was analyzed by XRD which indicated the formation of an anionic clay.

Example 11

Example 7 was repeated except that in the slurry before pre-aging and spray drying, ammonium vanadate solution containing 4 wt % of the vanadate (calculated on the reactant solids, defined as the oxide) was added and further after spray drying and calcining 6 wt % cerium nitrate in solution was added prior to aging. The rest of the processing conditions including calcination and aging was the same. The product was analyzed by XRD which indicated the formation of an anionic clay.

Example 12

Example 7 was repeated except that in the slurry before spray drying, lanthanum nitrate solution containing 10 wt % of the nitrate (calculated on the reactant solids, defined as the oxide) was added. The rest of the processing conditions including calcination and aging was the same. The product was analyzed by XRD which indicated the presence of an anionic clay.

Example 13

Example 7 was repeated except that in the precursor mixture before spray drying, 10 wt % of zinc nitrate in solution (calculated on the reactant solids, defined as the oxide) was added. Further, prior to aging 12 wt % ammonium heptamolybdate in solution was added. The product was analyzed by XRD which Indicated the presence of an anionic clay.

Example 14

An amorphous alumina gel material was mixed with magnesium oxide in a slurry in a molar Mg/Al ratio of close to 3, the pH was adjusted to close to 10. The slurry was homogenized under high shear mixing and pre-aged at 50° C. overnight. A sample of this pre-aged material was filtered, washed and dried at 120° C. XRD indicated the presence of anionic clay, brucite, boehmite and magnesium oxide. The pre-aged slurry was spray dried and calcined at 500° C. for 2 hours. Calcined microspheres ware aged in water containing 2 wt % ammonium carbonate solution at 65° C. for 8 hours. The product was filtered, washed and dried at 120° C. XRD indicated the presence of a hydrotalcite type anionic clay.

Example 15

Fine ground gibbsite (BOC) was slurried in water with the addition of magnesium oxide in a mixture having a Mg:Al molar ratio of about 2.5. The slurry was homogenized with high shear mixing. The slurry was then pre-aged overnight at 50° C. XRD analysis indicated the presence of unreacted gibbsite, unreacted magnesium oxide, brucite and anionic clay. The pre-aged slurry was spray dried and calcined at 500° C. for two hours. The product was slurried in water of 65° C. and aged for 8 hours.

Example 16

Example 15 was repeated except that in the starting precursor mixture 6 wt % cerium nitrate solution and 4 wt % ammonium vanadate in solution was added. The rest of the process was the same.

Example 17

Gel pseudoboehmite (P3®, ex Condea) was mixed with magnesium oxide and homogenized under high shear mixing. The Mg:Al ratio was 2.5. The pH was adjusted with ammonium hydroxide to close to 10 and the slurry was pre-aged at ambient temperature overnight. A sample was withdrawn, filtered, washed and dried at 120° C. XRD analysis indicated the presence of anionic clay, pseudoboehmite, magnesium oxide and brucite. The pre-aged slurry was spray dried and the microspheres were calcined at 500° C. for 2 hours. The calcined microspheres were divided into two portions. One portion was aged at ambient temperature overnight; the other portion was aged in water in an autoclave at 150° C. for one hour. XRD analysis of the two samples indicated that both products were anionic clay, except that the sample which was hydrothermally aged was more crystalline than the sample aged at ambient temperature.

Example 18

A mixture of BOC and magnesium oxide was prepared having a Mg:Al ratio of 2.3 and mixed in water. The mixture was milled in a colloid mill, the mixture was pre-aged at ambient temperature for 48 hours. Based on XRD analysis the material was estimated to contain 10–15 wt % anionic clay. The slurry was spray dried and calcined at 500° C. for two hours. After aging at 65° C. overnight XRD analysis indicated that the material was essentially a pure hydrotalcite-like anionic clay. The particles have acceptable physical properties such as bulk density an d attrition resistance to be suitable for use in fluid catalytic cracking.

Example 19

Example 18 was repeated except that in the precursor slurry 8 wt % cerium nitrate and 5 wt % ammonium vanadate salts were added in solution. Microspheres were tested in a circulating FCC pilot plant using a S-containing oil feed. The microspheres showed substantial activity for reducing the SOx content of the emitted regenerator gases.

Example 20

Example 19 was repeated except that in place of the cerium nitrate 10 wt % zinc nitrate was used. The resulting microspheres were tested as a FCC additive in cracking using a sulfur containing oil feed. The additive showed substantial activity in reducing the sulfur content of the FCC gasoline fraction.

Example 21

Example 20 was repeated with the addition that the microspheres were impregnated with a platinum metal solution.

Example 22

Example 20 was repeated with the addition that the microspheres were impregnated with a 1 wt % tungsten metal solution.

Example 23

Example 19 was repeated except that the ammonium vanadate salt was added during the aging step instead of during the pre-aging step.

Example 24

Example 18 was repeated except that calcined (at 400° C. for 2 hours) BOC was used. The product was analyzed by XRD and contained hydrotalcite anionic clay.

Example 25

Example 18 was repeated except that the aluminum source was an aluminum nitrate solution was used. The product was analyzed by XRD and contained anionic clay.

Example 26

Example 25 was repeated except that to the slurry 20 wt % lanthanum nitrate was added during the pre-aging. The product was analyzed by XRD and the product contained hydrotalcite anionic clay and lanthanum oxide. The product was tested as an additive in conjunction with a regular FCC catalyst in a FCC pilot plant using oil feed which contained sulfur, nickel and vanadium contaminants. The additive had substantial activity in reducing the SOx emissions of the regenerator gases and also a substantial activity in Ni and V passivation. Further, the additive showed an increase in bottoms cracking activity. Thus, the additive showed a "triple function" activity, namely for metal trapping, SOx reduction and bottoms conversion. The same result was obtained with an additive prepared according to example 18 with the addition of 25 wt % lanthanum nitrate during the pre-aging step.

Example 27

A mixture of gibbsite and magnesium oxide was prepared in water having a Mg:Al ratio of 2.3 and mixed in water. 40 wt % (based on the total solid content) kaolin was added. The mixture was milled in a colloid mill, the mixture was pre-aged at ambient temperature for 3 days. Based on XRD analysis the material contained 15 wt % anionic clay. The slurry was spray dried and calcined at 550° C. for two hours. The calcined microspheres were aged at ambient temperature in water followed by drying. XRD analysis indicated the formation of hydrotalcite anionic clay dispersed in kaolin matrix. The example is repeated using non-binding hydrotalcite instead of kaolin.

Example 28

Example 27 was repeated except that the kaolin was replaced with 30 wt % titanium oxide and 10 wt % zinc nitrate. XRD analysis indicated: that a particle was formed containing anionic clay dispersed in a titanium oxide matrix and zinc oxide. The product was tested as an additive in FCCU operation using a sulfur containing oil feed. The test results indicated that the additive has substantial activity in reducing the sulfur content in the gasoline fraction.

Example 29

Example 27 was repeated except that the kaolin was replaced with 40 wt % ZSM-5 zeolite. The anionic clay formed was dispersed within the zeolite phase. The product was used as an additive in FCCU operation.

Example 30

Example 29 was repeated except that in the aging slurry 10 wt % ammonium phosphate was added.

Example 31

Example 27 was repeated except that 30 wt % kaolin and faujasite zeolite was added to the precursor mixture. SEM analysis indicated that the microspheres contained a homogeneous mixture anionic clay, zeolite and kaolin. The product was tested for catalytic cracking activity in a FCCU operation using resid oil feed.

Example 32

Example 31 was repeated except that in the aging slurry 10 wt % ammonium phosphate was added. The final product was tested for catalytic activity and selectivity in a FCC testing unit.

Example 33

Example 27 was repeated except that the kaolin was replaced with 20 wt % sodium faujasite zeolite and that magnesium nitrate salt was added in the aging step to exchange the Na for Mg in the zeolite. SEM analysis indicated that the microspheres contained a homogeneous mixture anionic clay and zeolite. The product was tested for catalytic cracking and metal passivation in a FCCU operation using resid oil feed.

Example 34

Example 33 was repeated except that in addition to the magnesium nitrate an equal amount of lanthanum nitrate salt was added during the aging step. The product contained anionic clay and zeolite and was tested as a cracking catalyst in a FCC test unit.

Example 35

Example 34 was repeated except that at the end of the aging step, water was removed to obtain a paste which was extruded to form pellets. Said pellets were subsequently dried and calcined at 550° C. for 2 hours and aged overnight in water at 65° C.

Example 36

Gibbsite and magnesium oxide powders were milled and mixed with sufficient water to obtain a homogeneous paste which was extruded in a heated extruder, and the extrudates were immersed in water containing ammonium carbonate for 18 hours at 65° C. XRD analysis indicated that a anionic clay material was formed.

Example 37

Examples 35 and 36 were repeated except that 10 wt % nickel nitrate was added to the precursor mixture. The product was tested as a hydroprocessing catalyst.

Example 38

Examples 35 and 36 were repeated except that 10 wt % cobalt nitrate was added to the precursor mixture.

Example 39

The products of examples 37 and 38 were impregnated with a solution of ammonium heptamolybdate, calcined and tested as hydroprocessing catalysts

Example 40

Aluminum trihydrate BOC having small particles was slurried in water containing nitric acid with an initial pH of close to 1. Said slurry was hydrothermically treated at 180° C. for two hours. After this treatment magnesium oxide was added to this slurry with shear mixing. Said slurry was divided into three portions. The first portion was aged for 8 hours at 85° C. and then spray-dried.

The second portion was aged at 180° C. under autogeneous conditions and then spray dried. The third portion was spray dried directly, without aging.

The microspheres from the three portions described above were calcined at 50° C. for two hours and then rehydrated in water at room temperature.

All three samples of microspheres showed XRD patterns indicating the three products to be essentially anionic clays.

Example 41

Example 40 was repeated except that 10 wt % zinc nitrate (calculated on the final product, defined as the oxides) was dispersed in the acid/BOC containing slurry just before the addition of the MgO.

Example 42

Example 41 was repeated except that 8 wt % cerium nitrate and 4 wt % ammonium vanadate were added instead of the zinc nitrate.

Example 43

Example 40 was repeated except that during the pretreatment of the BOC aluminum salt was used as a seed. In all cases an anionic clay was produced.

Example 44

Example 40 was repeated except that during the pretreatment of the BOC alumina gel was used as a seed. All products essentially consisted of anionic clay.

What is claimed is:

1. A process for the preparation of shaped attrition resistant crystalline anionic clay.containing bodies from sources comprising an aluminum source and a magnesium source comprising the steps of:
   a) preparing a precursor mixture wherein at least 5 wt % of the final total amount of anionic clay is- formed upon preparing said precursor mixture,
   b) shaping the mixture to obtain shaped bodies,
   c) aging to obtain crystalline anionic clay-containing bodies, wherein more than 25 wt.% of the final total amount of anionic clay in the shaped body being formed after the shaping step b).
2. The process of claim 1 wherein the aluminum source comprises aluminum trihydrate or its thermally treated form.
3. The process of claim 1 wherein the aluminum source comprises (pseudo)boehmite.
4. The process of claim 1 wherein the aluminum source comprises an aluminum salt.
5. The process of claim 1 wherein the aluminum source is pre-treated.
6. The process of claim 1 wherein the magnesium source is pre-treated.
7. The process of claim 1 wherein the aluminum source comprises an amorphous alumina gel.
8. The process of claim 1 wherein the aluminum source comprises kaolin, bentonite, activated clay, acid treated clay, metakaolin and/or bauxite.
9. The process of claim 1 wherein the magnesium source comprises magnesium oxide.
10. The process of claim 1 wherein more than one aging step is conducted, optionally with intermediate drying steps, optionally followed by calcining.
11. The process of claim 10 wherein additives are added in any of the aging steps.
12. The process of claim 1 wherein the precursor mixture is pre-aged prior to the shaping step.
13. The process of claim 1 wherein additives are added in step a).
14. The process of claim 1 wherein additives are added after the shaping step b).
15. The process of claim 1 wherein additives are added during aging step c).
16. The process of claim 1 conducted batch-wise, continuous, continuous multi-step or partly batch-wise and partly continuous.
17. A crystalline anionic clay-containing shaped body obtained by the process of claim 1.
18. A crystalline anionic clay-containing body of claim 17 wherein alumina is present.
19. A crystalline anionic clay-containing body of claim 17 wherein magnesia is present.
20. Composite particle Comprising a crystalline anionic clay-containing body according to claim 17 which is embedded in binder material.

* * * * *